(12) United States Patent
Zhao

(10) Patent No.: US 9,436,323 B2
(45) Date of Patent: Sep. 6, 2016

(54) CAPACITIVE IN-CELL TOUCH-SCREEN PANEL, TOUCH-POSITIONING METHOD, AND DISPLAY DEVICE

(71) Applicant: BOE TECHNOLOGY GROUP CO., LTD., Beijing (CN)

(72) Inventor: Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 172 days.

(21) Appl. No.: 13/991,364

(22) PCT Filed: Nov. 8, 2012

(86) PCT No.: PCT/CN2012/084328
§ 371 (c)(1),
(2) Date: Jun. 3, 2013

(87) PCT Pub. No.: WO2014/000364
PCT Pub. Date: Jan. 3, 2014

(65) Prior Publication Data
US 2014/0111471 A1    Apr. 24, 2014

(30) Foreign Application Priority Data

Jun. 29, 2012  (CN) .......................... 2012 1 0226824

(51) Int. Cl.
*G06F 3/045* (2006.01)
*G06F 3/041* (2006.01)
(Continued)

(52) U.S. Cl.
CPC ........... *G06F 3/044* (2013.01); *G02F 1/13338* (2013.01); *G06F 3/0412* (2013.01); *G06F 3/0416* (2013.01); *G02F 2001/133334* (2013.01); *G06F 2203/04107* (2013.01)

(58) Field of Classification Search
CPC ..... G02B 26/02; G02B 26/023; G06F 3/044; G06F 3/0412; G06F 3/041; G06F 1/1692
See application file for complete search history.

(56) References Cited

U.S. PATENT DOCUMENTS

2010/0060600 A1*  3/2010  Wang et al. .................. 345/173
2010/0134427 A1*  6/2010  Tsai et al. ..................... 345/173
(Continued)

FOREIGN PATENT DOCUMENTS

| CN | 101017419 A | 8/2007 |
|---|---|---|
| CN | 101666931 A | 3/2010 |
| CN | 102096515 A | 6/2011 |
| CN | 102222475 A | 10/2011 |
| CN | 102279687 A | 12/2011 |
| CN | 102768604 A | 11/2012 |

OTHER PUBLICATIONS

International Search Report mailed Nov. 4, 2013; PCT/CN2012/084328.

(Continued)

*Primary Examiner* — Alexander Eisen
*Assistant Examiner* — Nan-Ying Yang
(74) *Attorney, Agent, or Firm* — Ladas & Parry LLP

(57) ABSTRACT

The present invention discloses a capacitive in-cell touch-screen panel, a touch-positioning method thereof, and a display device. At least one of the gate lines in a TFT array substrate is elected as a touch scanning line, and at least one of the data lines is elected as a touch sensing line; or contrarily, at least one of the data lines is elected as a touch scanning line, and at least one of the gate lines is elected as a touch sensing line, and in this way the function of the touch-screen panel is achieved. Because the gate lines and data lines in a TFT array substrate are used as touch scanning lines and touch sensing lines, there is no need to add additional wirings, and thus the aperture ratio of the TFT array substrate will not be reduced.

12 Claims, 4 Drawing Sheets

(51) Int. Cl.
   *G06F 3/044*     (2006.01)
   *G02F 1/1333*    (2006.01)

(56) References Cited

U.S. PATENT DOCUMENTS

| | | | |
|---|---|---|---|
| 2010/0194698 A1* | 8/2010 | Hotelling et al. | 345/173 |
| 2010/0315362 A1* | 12/2010 | Cheng et al. | 345/173 |
| 2011/0001714 A1* | 1/2011 | Sasaki | 345/173 |
| 2011/0102360 A1 | 5/2011 | Chen et al. | |
| 2011/0109568 A1* | 5/2011 | Wu et al. | 345/173 |

OTHER PUBLICATIONS

First Chinese Office Action dated Jan. 26, 2014; Appln. No. 201210226824.1.

Chinese Rejection Decision dated Sep. 2, 2014; Appln. No. 201210226824.1.

International Preliminary Report on Patentability dated Dec. 31, 2014; PCT/CN2012/084328.

Extende European Search Report dated Nov. 13, 2015; Appln. 12842679.8-1972 /2701043 PCT/CN2012084328.

\* cited by examiner

CAPACITIVE IN-CELL TOUCH-SCREEN PANEL, TOUCH-POSITIONING METHOD, AND DISPLAY DEVICE

TECHNICAL FIELD

The present invention relates to a capacitive in-cell touch-screen panel, a touch-positioning method, and a display device.

BACKGROUND

With rapid development of display technology, touch-screen panels have been gradually applied in many aspects of people's life. At present, touch-screen panels, according to their working principles, can be classified as: resistive, capacitive, infrared, and surface acoustic wave types. Among them, capacitive touch-screen panels, by virtue of their unique touch principles and their advantages of high sensitivity, long life and high light transmittance, etc., become the most favorable and pursued products in the industry.

At present, a capacitive in-cell touch-screen panel can be achieved by additionally incorporating touch scanning lines and touch sensing lines directly on a TFT (Thin Film Transistor) array substrate; that is, on the surface of a TFT array substrate, two layers of strip-like ITO (Indium Tin Oxide) electrodes, which are on different levels and intersect with each other, are manufactured, and these two layers of ITO electrodes are used as touch scanning lines and touch sensing lines of the touch-screen panel, respectively; meanwhile, an inductive capacitor is formed at the non-coplanar intersection between the two ITO electrodes. The working process of the above-described in-cell touch-screen panels is: when touch scan signals are loaded to an ITO electrode acting as a touch scanning line, the coupled voltage signals obtained by a touch sensing line via an inductive capacitor are detected, and during this process, when a human body contacts the touch-screen panel, the human body electric field will act on the inductive capacitor, which causes the capacitance of the inductive capacitor to change, and further causes the coupled voltage signals obtained by the touch sensing line to change; then, according to the changes of the voltage signals, the position of the touch-point can be determined.

An aperture ratio refers to a proportion of the light transmission area of each pixel without the area of wirings and transistor (usually shielded by a black matrix) to the total area of this pixel. The higher the aperture ratio, the higher the efficiency of light transmission is. The above-described capacitive in-cell touch-screen panel will reduce the aperture ratio of the TFT substrate, and further affect the light transmittance of the TFT array substrate because additional touch scanning lines and touch sensing lines as well as driver circuits are needed on a TFT array substrate.

Moreover, in the above-described capacitive in-cell touch-screen panel, the added two layers of ITO electrodes will overlap with the existing data lines and gate lines in a TFT array substrate in a vertical direction, and therefore the ITO electrodes, when transmitting touch scan signals, will cause severe signal-interference with the primary display drive signals in the TFT array substrate, which will probably result in maloperation of the TFT array substrate.

SUMMARY

Embodiments of the present invention provide a capacitive in-cell touch-screen panel, a touch-positioning method thereof, and a display device, for improving the aperture ratio of an existing capacitive in-cell touch-screen panel.

According to an embodiment of the present invention, there is provided a capacitive in-cell touch-screen panel, comprising: a TFT array substrate comprising data lines and gate lines; at least one of the gate lines is elected as a touch scanning line, and at least one of the data lines is elected as a touch sensing line; alternatively, at least one of the data lines is elected as a touch scanning line, and at least one of the gate lines is elected as a touch sensing line; the touch scanning line is used to transmit a touch scan signal; the touch sensing line is used to obtain a voltage signal which is formed through coupling with the touch scan signal via an inductive capacitor and output the voltage signal; and the inductive capacitor is formed at a non-coplanar intersection between the touch scanning line and the touch sensing line.

An embodiment of the present invention also provides a display device, which comprises a capacitive in-cell touch-screen panel in accordance with an embodiment of the present invention.

In addition, an embodiment of the present invention further provides a touch-positioning method, based on a capacitive in-cell touch-screen panel in accordance with an embodiment of the invention, the method comprising: loading a touch scan signal to the touch scanning line provided in the touch-screen panel; obtaining and detecting a voltage signal, which are formed through coupling with the touch scan signal via an inductive capacitor, by the touch sensing line; and determining a position of a touching point on the touch-screen panel based on a change of the detected voltage signal and a position of the inductive capacitor.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
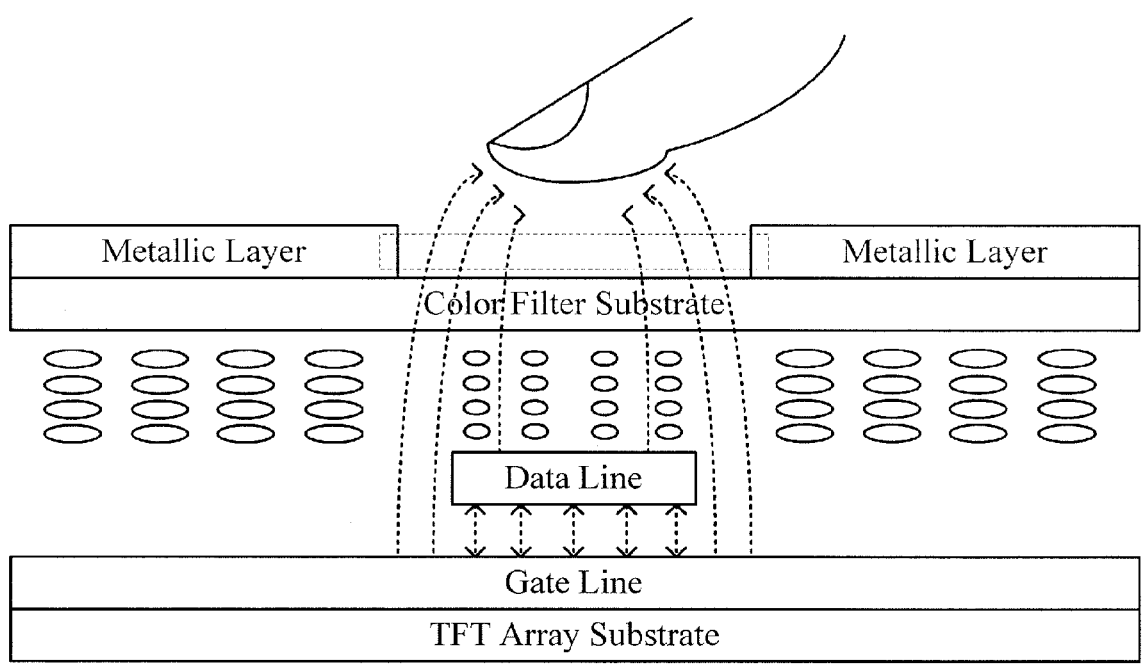
FIG. 1 is a schematic structural diagram of a capacitive in-cell touch-screen panel, according to an embodiment of the present invention.

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, technical jargon or scientific terms used herein should be interpreted in the usual sense as understood by those ordinary skilled in the relevant art of the present invention. The terms "first", "second", and the like, used in the specification and claims of this patent application of the invention, do not denote any order, quantity, or importance, but are used to distinguish among different integral parts. Similarly, the terms "a", "an", "the" and the like, herein do not denote a limitation of quantity, but rather denote the presence of at least one of the referenced item.

Hereinafter, in connection with the accompanying drawings, specific examples of a capacitive in-cell touch-screen panel, a touch-positioning method thereof, and a display device in accordance with embodiments of the present invention will be described in detail.

In the drawings, thicknesses of various layers of thin films, as well as shapes and sizes of their regions, do not in scale reflect an array substrate or a color-filter substrate; instead, they are only intended for the purpose of schematic illustration of the technical disclosure herein.

According to an embodiment of the present invention, a capacitive in-cell touch-screen panel, as shown in FIG. 1, comprises: a TFT array substrate having data lines and gate lines; at least one of the gate lines is elected as a touch scanning line, and at least one of the data lines is elected as a touch sensing line; alternatively, at least one of the data lines is elected as a touch scanning line, and at least one of the gate lines is elected as a touch sensing line; the touch scanning line is used to transmit a touch scan signal; the touch sensing line is used to obtain sensing voltage signals by coupling with the touch scan signals via inductive capacitors and output the sensing voltage signals; the inductive capacitor is formed at a non-coplanar intersection between the touch scanning line and the touch sensing line.

The capacitive in-cell touch-screen panel in accordance with the embodiment of the invention, as shown in FIG. 1, may further comprise: a color-filter substrate, provided above the TFT array substrate and in the same size as the TFT array substrate; the color-filter substrate has a metallic layer on the side facing away the TFT array substrate, for shielding an external electric-field; the metallic layer is distributed in regions other than the corresponding region to the inductive capacitor, that is, the metallic lay has no pattern in the corresponding region to the inductive capacitor, and the region without pattern is as shown with a dashed-line block in FIG. 1.

Figure 2:
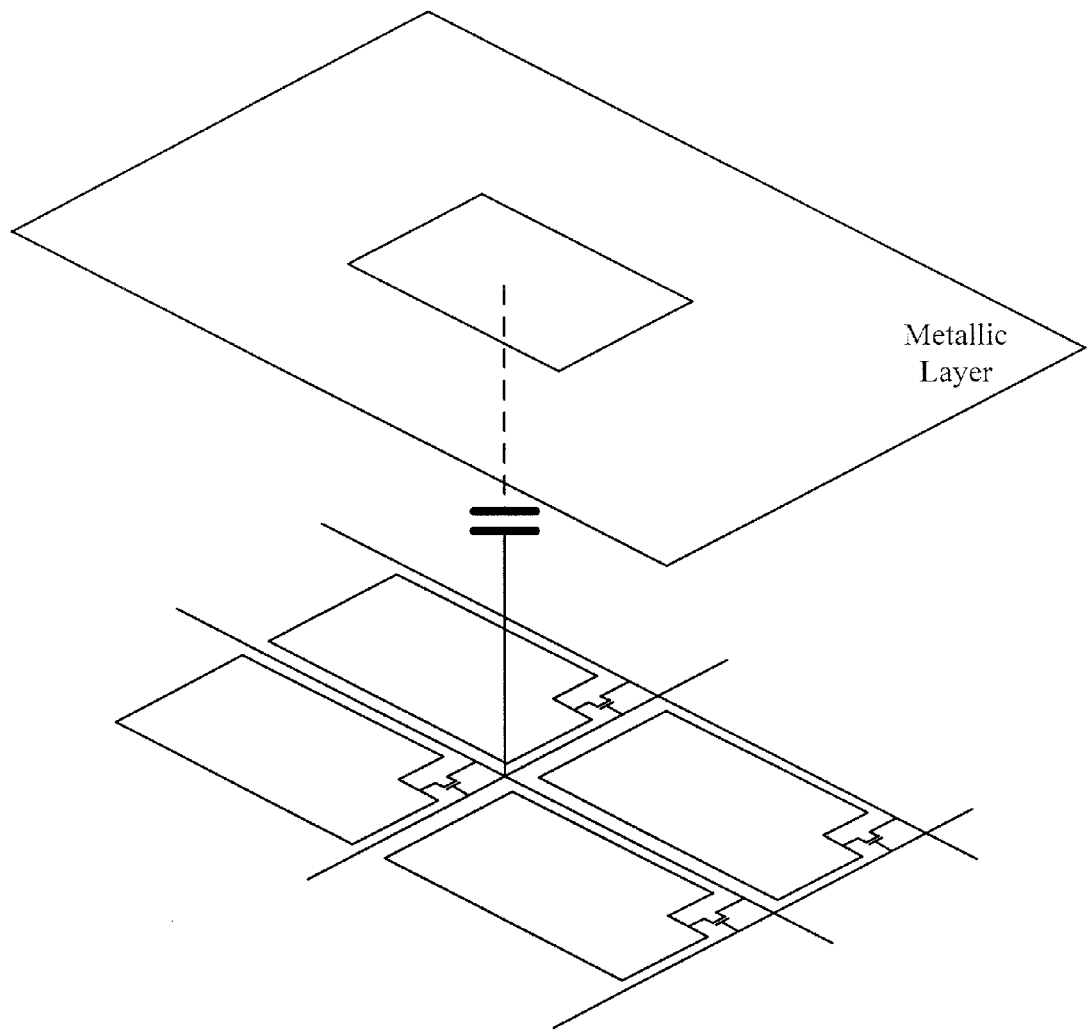
FIG. 2 is an exploded schematic structural diagram of a capacitive in-cell touch-screen panel, according to an embodiment of the present invention.

In a specific example, for example, the material of the metallic layer may be ITO, and the metallic layer can shield interference of an external electric field; also, as shown in an exploded schematic structural diagram of FIG. 2, the metallic layer has no pattern (i.e., opening a window) in the corresponding region of the formed inductive capacitor, so that a human body electric field can act on the inductive capacitor through the window-like region; thus, because the human body electric field will cause the capacitance of the corresponding inductive capacitor to change, it can be determined through the changes of the coupled voltages of the inductive capacitor whether there exists an touch-point.

Usually, the touch precision of a touch-screen panel is of a millimeter-order, whereas the display precision of a TFT array substrate is of a micron-order; thus, the required touch scanning lines and touch sensing lines for a touch screen are much less in number than the required driving lines (i.e., data lines and gate lines) for the display of a TFT array substrate; moreover, in a TFT array substrate, the data line and gate line corresponding to each TFT intersect in a non-coplanar way, that is, the two lines are mutually insulated from each other while their projections in the vertical direction intersect with each other; therefore, part of the driving lines (i.e., data lines and gate lines) of a TFT array substrate can be used as touch lines (i.e., touch scanning lines and touch sensing lines) of a touch-screen panel, and inductive capacitors are formed at the non-coplanar intersections between the data lines and gate lines, for the purpose of achieving the function of a capacitive touch-screen panel.

As an example, in the capacitive in-cell touch-screen panel in accordance with the embodiment of the present invention, with regard to the arrangements of the touch scanning lines and the touch sensing lines, typically, the touch scanning lines are spaced at an equal interval, and the touch sensing lines are spaced at an equal interval.

As another example, the interval between the touch scanning lines may be the same as the interval between the touch sensing lines in order to unify the touch precision of the touch-screen panel.

In different examples, part of the data lines in a TFT array substrate may be used as touch scanning lines, and correspondingly, the gate lines non-coplanar intersecting with them are used as touch sensing lines; it is also possible that, part of the gates lines in a TFT array substrate are used as touch scanning lines, and correspondingly, the data lines non-coplanar intersecting with them are used as touch sensing lines.

Hereinafter, the technology provided in the present invention will be described with respect to an example in which gate lines are used as touch scanning lines and the corresponding data lines are used as touch sensing lines.

For example, the capacitive in-cell touch-screen panel in accordance with the embodiment of the present invention further comprises: a touch signal receiver, connected with the provided touch sensing lines, and configured to receive voltage signals output from the touch sensing lines.

In different examples, the touch signal receiver may be integrated within an IC chip used for driving the data lines of the TFT array substrate, or may be provided separately.

The capacitive in-cell touch-screen panel in accordance with the embodiment of the present invention, for example, further comprises: a touch switch element provided between each touch sensing line and the touch signal receiver, and configured to switch on the connection between the touch sensing line and the touch signal receiver after the touch scan signals transmitted by the touch scanning line complete the operation of discharging pixels; when the touch scan signals transmitted by the touch scanning line charge pixels, it switches off the connection between the touch sensing line and the touch signal receiver.

For example, the touch switch element may be provided within the touch signal receiver, or may be provided at the connection site of a touch sensing line and the touch signal receiver.

In a specific example, the number of the touch switch elements may be in accordance with the number of the provided touch sensing lines. A touch switch element may be implemented as a TFT.

The capacitive in-cell touch-screen panel in accordance with the embodiment of the present invention, for example, further comprises: a display driver connected with the touch sensing lines, and a driver switch element provided between the touch sensing line and the display driver; the display driver is configured to load display drive signals to the touch sensing line; the driver switch element is configured to switch off the connection between the touch sensing line and the display driver after the touch scan signals transmitted by the touch scanning line complete discharging pixels; when the touch scan signals transmitted by the touch scanning line charge pixels, it switches on the connection between the touch sensing line and the display driver.

In different examples, the driver switch element may be provided within the display driver, or may be provided at the connection site of a touch sensing line and the display driver.

In practice, the number of the driver switch elements may be in accordance with the number of the provided touch sensing lines, and a driver switch element may be implemented as a TFT.

When the touch scanning lines are loaded with signals, a time-division drive mode may be employed to drive the touch operation and the LCD display for eliminating signal interference between the two of them.

Figure 3:
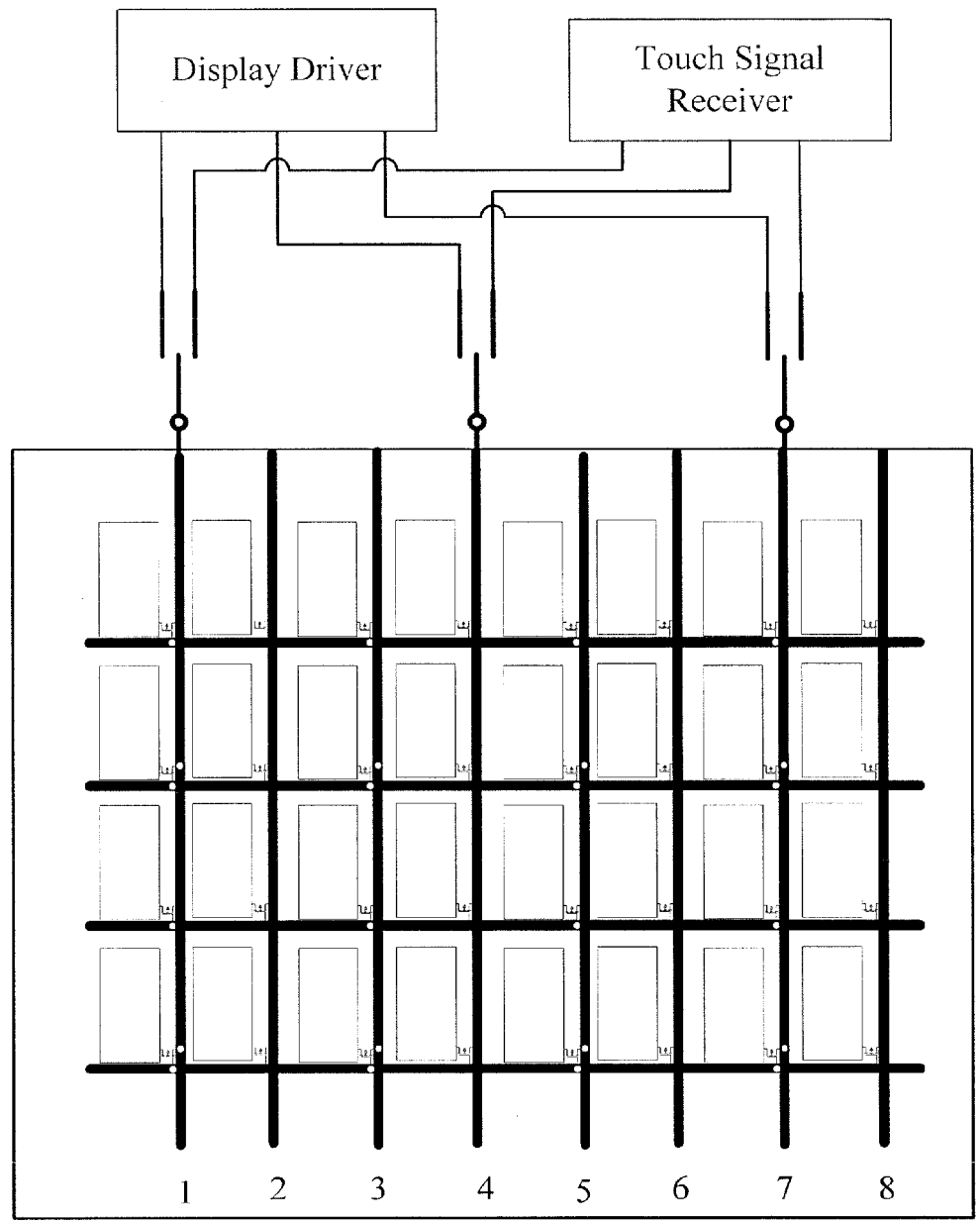
FIG. 3 is a schematic circuit diagram of a capacitive in-cell touch-screen panel, according to an embodiment of the present invention.

FIG. 3 is a schematic circuit diagram of a capacitive in-cell touch-screen panel according to an embodiment of the present invention. As shown in FIG. 3, one touch sensing line is elected for every three data lines, that is, the 1st, 4th and 7th data lines are elected as touch sensing lines, respectively. Every touch sensing line is connected, via a touch switch element and a display switch, to a touch signal receiver and a display driver, respectively. One touch scanning line is elected for every N+1 rows of gate lines, that is, the 2nd and (N+2)-th rows of gate lines are elected as touch scanning lines.

In an example, the driver circuit for the gate lines and the touch scanning lines may be implemented by using an existing gate-line driver circuit, for example, the driver circuit may be a GOA (Gate Driver on Array, which is an array substrate row-driver circuit), a COF (Chip on Flexible Printed Circuit, which is an external flexible driver circuit), or a COG (Chip on Glass, which is an external integrated circuit).

Figure 4:
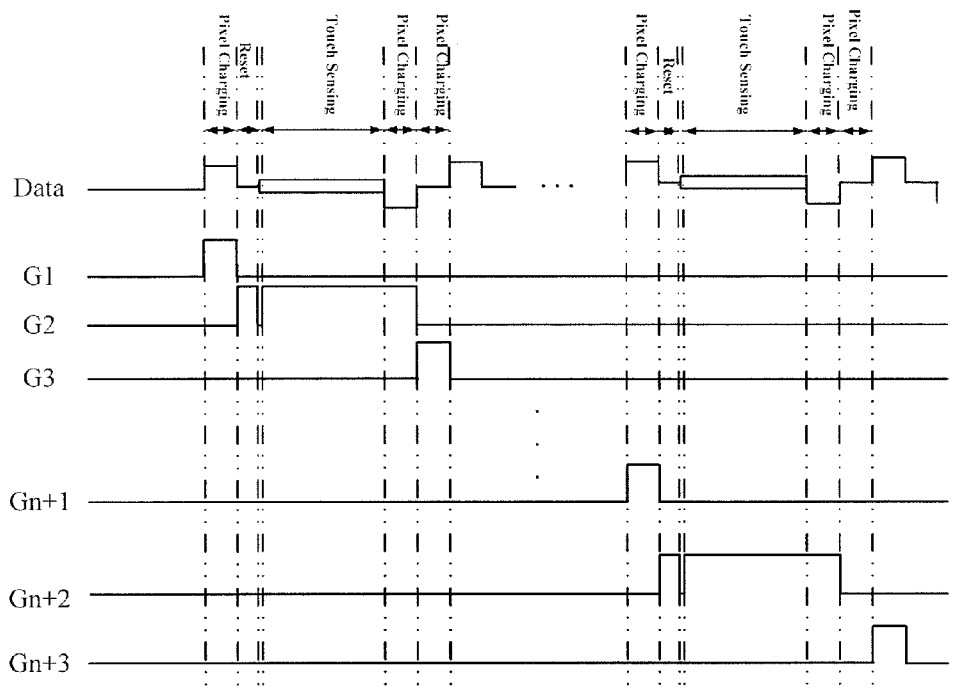
FIG. 4 is a drive timing chart of the capacitive in-cell touch-screen panel shown in FIG. 3.

FIG. 4 illustrates a drive timing chart of the embodiment shown in FIG. 3; at first, when the first row of gate line G1 is loaded with a high-level signal, the touch switch element corresponding to each of the touch sensing lines is switched off while the display switch is switched on, so that display signals are loaded from the display driver, that is, each touch sensing line charges the first row of pixels.

Then, when the second row of gate line G2 acting as a touch scanning line starts scanning, the first pulse is a reset signal, which functions to discharge the electricity of this row of pixels, in order to ensure that, when this row of gate line is at touch scanning, the corresponding touch sensing lines have the same voltage to prevent the problem of the displayed images, which is caused by different voltages on the data lines that act as the touch sensing lines. After the completion of the discharge, the second row of gate line G2 starts touch scanning; at this time, the touch switch element corresponding to each of the touch sensing lines is switched on while the display switch is switched off, thus the touch scan signals loaded on the second row of gate line G2 are coupled via inductive capacitors, and then transmitted through each of the touch sensing lines to the touch signal receiver, and during this process, if there is a finger-touch activity, the value of the capacitance of the corresponding inductive capacitor(s) will change, resulting in a different voltage signal on the touch sensing line(s). At the end of the touch scan signals which are loaded on the second row of gate line G2, this row of pixels are charged; at this time, the touch switch element corresponding to each of the touch sensing lines is switched off while the display switch is switched on, that is, each of the touch sensing lines is connected to the display driver, so that this row of pixels will not be mistakenly charged when undertaking a touch scan, and the mistake charging otherwise will result in an abnormal display screen.

Finally, the third row of gate line is loaded with normal display drive signals, and after the (N+2)-th row of gate line (Gn+2) acting as a touch scanning line starts scanning, then the foregoing operations of the touch sensing lines are implemented repeatedly.

An embodiment of the present invention also provides a display device, which comprises the capacitive in-cell touch-screen panel in accordance with the embodiment of the invention.

The present disclosure further provides a touch-positioning method, based on the capacitive in-cell touch-screen panel in accordance with the embodiment of the invention; the principle of this method to solve the technical problems is similar to the aforementioned capacitive in-cell touch-screen panels, and therefore, the implementation of the method may refer to the working principles of the aforementioned capacitive in-cell touch-screen panels.

Figure 5:
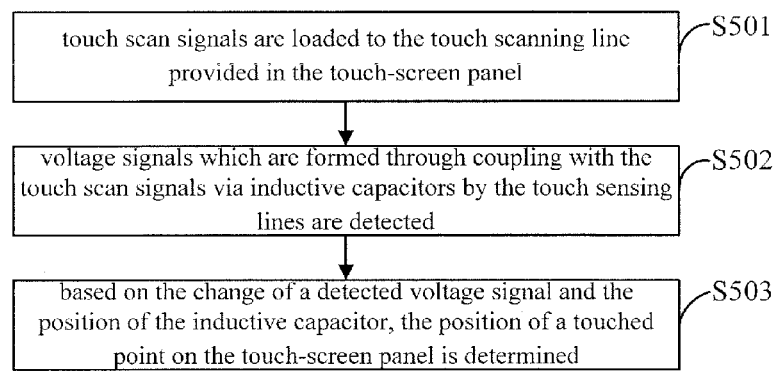
FIG. 5 is a flowchart of a touch-positioning method, in a capacitive in-cell touch-screen panel according to an embodiment of the present invention.

In an example, in the touch-positioning method, as shown in FIG. 5, for example: at step S501, touch scan signals are loaded to the touch scanning line provided in the touch-screen panel; at step S502, voltage signals which are formed through coupling with the touch scan signals via inductive capacitors by the touch sensing lines are detected; each of the inductive capacitor is formed at a non-coplanar intersection of a touch scanning line and a touch sensing line, and when there is a touch operation in the corresponding region of the inductive capacitor, the value of the capacitance of the inductive capacitor will change; at step S503, based on the change of a detected voltage signal and the position of the inductive capacitor, the position of a touched point on the touch-screen panel is determined.

In the capacitive in-cell touch-screen panel, the touch-positioning method thereof and the display device, which are provided by the embodiments of the present invention, at least one of the gate lines in a TFT array substrate is elected as a touch scanning line, and at least one of the data lines is elected as a touch sensing line; or contrarily, at least one of the data lines is elected as a touch scanning line, and at least one of the gate lines is elected as a touch sensing line, and in this way the functions of the touch-screen panel are achieved.

Compared with an existing touch-screen panel, because the existing gate lines and data lines in a TFT array substrate are used as touch scanning lines and touch sensing lines, there is no need to add additional wirings, and thus the aperture ratio of the TFT array substrate will not be reduced.

The above are merely exemplary implementations of the present invention, but not for limiting the scope of the invention; instead, the scope of the invention should be defined by the appended claims.

The invention claimed is:

1. A capacitive in-cell touch-screen panel, comprising: a thin film transistor (TFT) array substrate comprising data lines and gate lines; and a color-filter substrate provided above the TFT array substrate,
   at least one of the gate lines is elected as a touch scanning line, and at least one of the data lines is elected as a touch sensing line; alternatively, at least one of the data lines is elected as a touch scanning line, and at least one of the gate lines is elected as a touch sensing line;
      wherein,
   the touch scanning line is used to transmit a touch scan signal;

the touch sensing line is used to obtain a voltage signal which is formed through coupling with the touch scan signal via an inductive capacitor and output the voltage signal; the inductive capacitor is formed at a non-coplanar intersection between the touch scanning line and the touch sensing line, and wherein the color-filter substrate comprises a metallic layer which is conductive on the side facing away the TFT array substrate for shielding an external electric field; and the metallic layer is distributed in a region other than the corresponding region of the inductive capacitor.

2. The touch-screen panel according to claim 1, wherein the touch scanning lines are spaced at an equal interval, and the touch sensing lines are spaced at an equal interval.

3. The touch-screen panel according to claim 2, wherein the interval between the touch scanning lines is the same as the interval between the touch sensing lines.

4. The touch-screen panel according to claim 1, wherein the color-filter substrate is in the same size as the TFT array substrate.

5. The touch-screen panel according to claim 1, further comprising: a touch signal receiver, connected with the touch sensing line, and used to receive the voltage signal output from the touch sensing line.

6. The touch-screen panel according to claim 5, further comprising: a touch switch element, provided between the touch sensing line and the touch signal receiver, and configured to switch on the connection between the touch sensing line and the touch signal receiver after the touch scan signal transmitted by the touch scanning line completes discharging of pixels, and to switch off the connection between the touch sensing line and the touch signal receiver when the touch scan signal transmitted by the touch scanning line charges pixels.

7. The touch-screen panel according to claim 6, further comprising: a display driver, connected with the touch sensing line; and a driver switch element, and provided between the touch sensing line and the display driver;

the display driver is used to load a display drive signal to the touch sensing line; and the driver switch element is configured to switch off the connection between the touch sensing line and the display driver after the touch scan signal transmitted by the touch scanning line completes discharging of pixels, and to switch on the connection between the touch sensing line and the display driver when the touch scan signal transmitted by the touch scanning line charges pixels.

8. The touch-screen panel according to claim 7, wherein the touch switch element is provided within the touch signal receiver, or provided at the connection site of the touch sensing line and the touch signal receiver; and the driver switch element is provided within the display driver, or provided at an connection site of the touch sensing line and the display driver.

9. The touch-screen panel according to claim 6, wherein the touch switch element is a TFT.

10. A display device, comprising a capacitive in-cell touch-screen panel in accordance with claim 1.

11. A touch-positioning method, based on a capacitive in-cell touch-screen panel in accordance with claim 1, comprising:

loading a touch scan signal to the touch scanning line provided in the touch-screen panel;

obtaining and detecting a voltage signal, which are formed through coupling with the touch scan signal via an inductive capacitor, by the touch sensing line; and determining a position of a touching point on the touch-screen panel based on a change of the detected voltage signal and a position of the inductive capacitor.

12. The touch-screen panel according to claim 7, wherein the driver switch element is a TFT.

* * * * *